United States Patent [19]

Wolfe et al.

[11] 4,225,700
[45] Sep. 30, 1980

[54] THERMALLY STABLE ROD-LIKE POLYBENZOBISTHIAZOLE POLYMERS

[75] Inventors: James F. Wolfe, Menlo Park; Bock H. Loo, San Francisco, both of Calif.

[73] Assignee: SRI International, Menlo Park, Calif.

[21] Appl. No.: 32,539

[22] Filed: Apr. 23, 1979

[51] Int. Cl.³ .............................................. C08G 69/32
[52] U.S. Cl. ............................. 528/337; 260/30.8 R; 528/179; 528/183; 528/336; 528/377
[58] Field of Search ................................ 528/337, 377

[56] References Cited

U.S. PATENT DOCUMENTS

| 3,424,720 | 1/1969 | Rudner et al. | 528/377 |
| 3,448,080 | 6/1969 | Hirsh | 528/377 |
| 4,051,108 | 9/1977 | Helminiak et al. | 528/337 |

OTHER PUBLICATIONS

Polymer Preprints–Helminiak et al., 16(2), (1975), pp. 659–662.
U.A.R.J. Chem–Osman et al., 14 (1971), pp. 475–491.

Primary Examiner—Harold D. Anderson
Attorney, Agent, or Firm—Donovan J. DeWitt

[57] ABSTRACT

Thermally stable rod-like polymers comprised of poly {[benzo-(1,2-d:4,5-d')bisthiazole-2,6-diyl]-1,4-phenylene}, said polymers being referred to as "PBT" and having the structure

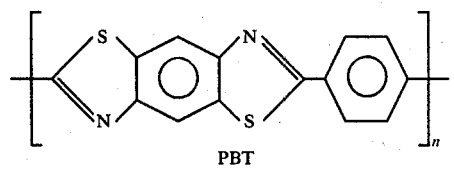

PBT wherein n has an average value of about 50 to 100, together with the monomeric compound 2,5-diamino-1,4-benzenedithiol dihydrochloride. Said polymers are useful in the preparation of high modulus, high strength materials having excellent thermal stability.

2 Claims, 1 Drawing Figure

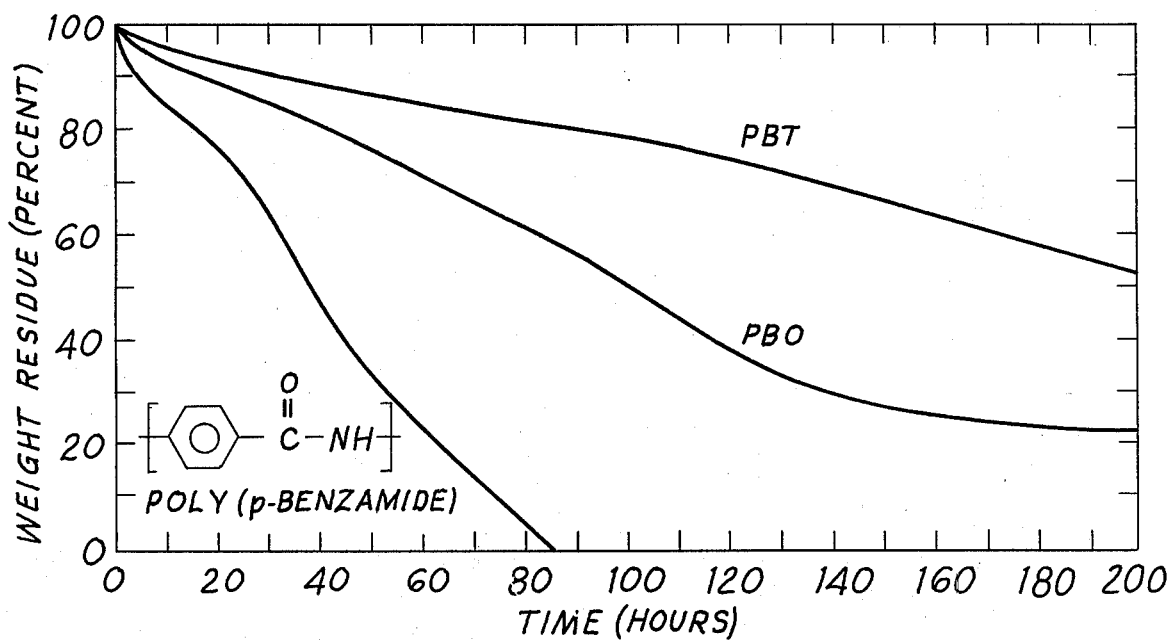
ISOTHERMAL AGING IN CIRCULATING AIR AT 371° C

THERMALLY STABLE ROD-LIKE POLYBENZOBISTHIAZOLE POLYMERS

BACKGROUND OF THE INVENTION

The invention described herein was made in the course of work under Contract No. F33615-76-C-5109 with the United States Government.

Considerable research efforts in recent years have been directed toward the synthesis, characterization, and fabrication of extended chain or rod-like polymers. The unique ordering properties of these polymers into liquid crystalline solutions has led to the preparation of extremely high modulus/high strength fibers. The aromatic polyamides and the aromatic polyamide-hydrazides are members of this class of rod-like polymers. They owe their liquid crystalline behavior to the linearity of monomer catenation and the predominately trans-configuration of the amide group, which is formed in the polycondensation reaction.

However, it has been observed that the thermo-oxidative and hydrolytic stability of amide linkage-containing polymers does not meet some advanced aerospace requirements. It has been concluded that the requisite stability can only be achieved through the use of totally aromatic polymers, preferably those prepared by condensation reactions which form aromatic or heterocyclic fused ring systems which have 180° catenation of the repeat unit.

Earlier work with polymers of this character concerned itself with the preparation and testing of a compound referred to as "PBO". This polymer, poly {[benzo(1,2-d:5,4-d')bisoxazole-2,6-diyl]-1,4-phenylene} was synthesized by the condensation of 4,6-diaminoresorcinol dihydrochloride with terephthalic acid in polyphosphoric acid, and has the formula

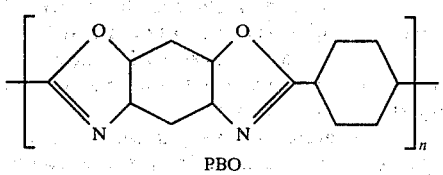

PBO

PBO is described in "Potential Approach to Non-reinforced Composites" by T. E. Helminiak, F. E. Arnold, and C. L. Benner, Polymer Preprints, 16, (2), pp 659-662 (1975). While PBO exhibited improved thermo-oxidative stability and formed liquid crystalline solutions in methanesulfonic acid (MSA) and chlorosulfonic acid (CSA), the highest intrinsic viscosity obtained for it was 3.7 dl/g in MSA at 30° C. For a rod-like polymer of this nature this value represents a number average molecular weight of less than 10,000.

An object of the present invention is to provide a structural analog of PBO having a greatly increased molecular weight as well as improved thermal stability, as compared thereto.

SUMMARY OF THE INVENTION

The foregoing and other objects of the present invention were achieved in part by the discovery of a new monomeric compound, 2,5-diamino-1,4-benzenedithiol dihydrochloride, and a method for preparing the same, said monomer having the structure indicated at 1 below,

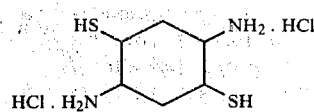

The other objects of the invention were achieved by the discovery of a new polymer prepared by reacting monomer 1 with terephthalic acid. Said polymer is known as "PBT" and has the structure indicated below,

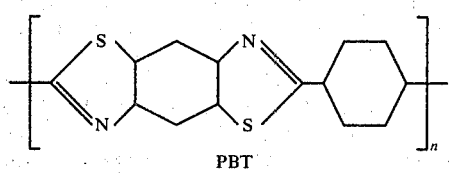

PBT wherein n has a value of from about 50 to 100.

Compound 1, although never prepared heretofore to applicants' knowledge, has been erroneously recited in the literature, see A. M. Osman and S. A. Mohamed, UAR, J. Chem., 14, 475 (1971). The compound reported in this article was actually 1,4-diamino-2,3-benzenedithiol dihydrochloride and not 2,5-diamino-1,4-benzenedithiol dihydrochloride. The authors' error arose from the fact that they based their synthesis on an intermediate prepared by the method of A. G. Green and A. G. Perkins, see "Polythiosulphonic Acids of p-Diamines", J. Chem. Soc., 83, 1201 (1903). The structural assignment given by Green and Perkin was shown to be erroneous by two independent workers. (S. L. Solar, R. J. Cox, N. J. Clecak and R. Ettinger, "Synthesis and Proof of Structure of 2,6-Diaminobenzo[1,2-d:4,5-d']bisthiazole", J. Org. Chem., 33, pp 2132-2133, (1968), and J. K. Landquist, "Diaminobenzobisthiazoles and Related Compounds", J. Chem. Soc. (C), pp 2212-2220, (1967)).

In the formula given above for the new polymer (PBT) of the present invention, n has a value of from about 50 to 100, this representing an average molecular range of from about 13,300 to about 26,600. This corresponds to an intrinsic viscosity range of from about 6 dl/g to 24 dl/g, as measured in methanesulfonic acid at 30° C.

PBT within the above-described range of average molecular weights forms liquid crystalline solutions in solvents such as polyphosphoric acid, methanesulfonic acid and chlorosulfonic acid. These liquid crystalline solutions are useful in the preparation of high modulus, high strength materials having excellent thermal stability.

The polymer in such solutions can be recovered in one solid form or another by recovering the polymer in a solvent-free condition. Thus, polymer filaments can be recovered by spinning the solution into water, methanol or other liquid in which the acid present in the solutions is soluble but in which the polymer is insoluble. Spinning in this fashion is usually accompanied by a certain amount of draw down of the polymer solution (to increase its molecular orientation) before the solution reaches the water or methanol.

The thermal stability of PBT is graphically presented by the curves of the FIGURE hereof wherein the weight stability of PBT with time during isothermal aging in air at 371° C. is shown to be much superior to that of PBO and of poly(p-benzamide) materials under the same physical conditions. Thus, weight retention in the case of PBT exceeded 50% after 200 hr at 371° C., while that of PBO was less than 30%. Weight loss of the polybenzamide was complete after about 8.5 hr.

The present invention is illustrated in various of its embodiments by the following examples:

EXAMPLE I 2,5-Diamino-1,4-benzenedithiol dihydrochloride 1

Diaminobenzobisthiazole 2 prepared by the method of S. L. Solar, R. J. Cox, N. J. Clecak and R. Ettinger, see "Synthesis and Proof of Structure of 2,6-Diaminobenzo[1,2-d:4,5-d']bisthiazole", J. Org. Chem., 33, No. 5, pp 2132–2133, (May, 1968), was hydrolyzed to the potassium salt of monomer 1 by the following method: A mixture of compound 2 and 21 N potassium hydroxide was heated at the reflux temperature for 5 hr. The resulting yellow solution was allowed to stand and cool overnight. The resulting crystals were collected under an inert atmosphere by filtration. Conversion to the dihydrochloride salt 1 was performed by dissolving the potassium salt in deaerated water and pouring the solution into dilute hydrochloric acid containing 5% stannous chloride. The resulting bright yellow slurry was heated to 70° C. and an equal volume of concentrated hydrochloric acid was then added. The resulting pale yellow crystals were collected by filtration, pressed as dry as possible and washed with diethyl ether. The monomer was then recrystallized by stirring with dilute hydrochloric acid containing 5% stannous chloride, heating to 70° C., and adding an equal volume of concentrated hydrochloric acid. The colorless crystals were then collected by filtration, pressed as dry as possible, washed with diethyl ether, and then dried to constant weight at 25° C. under reduced pressure (<0.05 torr). Mp: decomposition without melting; ir(KBr) 3000–2700 (broad) and 2580 ($NH_3Cl$), 2460 $cm^{-1}$ (SH); mass spectrum (70 eV) m/e 172 (M+ −2HCl), 139 (M+H−$H_2S$).

Anal. Calcd for $C_6H_{10}N_2S_2Cl_2$: C, 29.39; H, 4.11; N, 11.43. Found: C, 29.17; H, 4.08; N, 11.60.

EXAMPLE II

General method for the preparation of poly{[benzo(1,2-d:4,5-d')bisthiazole-2,6-diyl]-1,4-phenylene} (PBT)

The polymerization of 2,5-diamino-1,4-benzenedithiol dihydrochloride (1) with terephthalic acid was performed in freshly prepared 85% polyphosphoric acid (PPA) by the following operations all of which were performed under an inert atmosphere.

PPA was prepared by slowly adding 1.52X grams of phosphorus pentoxide to X grams of cold 86% phosphoric acid. The resulting slurry was heated at 150° C. for 5–8 hr to give a homogeneous colorless liquid and then allowed to cool to room temperature.

A mixture of monomer 1 (10–20% by weight) in PPA was stirred at room temperature for 24 hr and then heated slowly to 70° C. to effect dehydrochlorination. A stoichiometric amount of finely powdered terephthalic acid and additional PPA (to give a theoretical polymer concentration of from about 4 to 6% by weight) were then added. The resulting mixture was then slowly heated with vigorous stirring to 150° C. and maintained at that temperature until all of the terephthalic acid dissolved. The temperature was then raised to 175°–185° C. and maintained at that temperature for 24–48 hr. The polymerization mixture was then precipitated into water and successively washed with water, dilute ammonium hydroxide, and then water. Freeze-drying of the polymer and then drying at 110°/0.05 torr for 48 hr afforded quantitative yields of a golden polymer. Intrinsic viscosities in the range of 6–26 dl/g can be obtained by varying reaction time at 175°–185° C.

EXAMPLE III

Poly{[benzo(1,2-d:4,5-d')bisthiazole-2,6-diyl]-1,4-phenylene} (PBT)

A mixture of monomer 1 (6.384 g, 26.040 mmol) and 325 g of PPA was stirred at room temperature under nitrogen for 24 hr and then heated to 70° C. to effect dehydrochlorination. Terephthalic acid (4.3260 g, 26.040 mmol) and 135 g of PPA were then added. The mixture was then heated with stirring as follows: 90° for 30 min; 110° for 40 min; 140° for 1.5 hr; 150° for 7 hr and 175° C. for 9 hr. The polymer mixture was then stirred with 50 g of MSA and poured into 4 L of methanol. The red polymer was washed with water, aqueous ammonium hydroxide, methanol and then freeze-dried from benzene. Drying at 110° C./0.5 torr for 12 hr gave 6.9 (99%) of a golden polymer; [η]=11.2 dl/g in MSA at 30° C.

Anal. calcd for $C_{14}H_6N_2S_2$: C, 63.13; H, 2.27; N, 10.51; S, 24.08. Found: C, 61.75; H, 2.46; N, 10.24; S, 23.22.

PBT prepared as described above dissolved readily in methanesulfonic acid and chlorosulfonic acid. Liquid crystalline acid solutions were obtained at room temperature at concentrations near 10%. Light scattering measurements were carried out in both acids on a sample with an intrinsic viscosity of 6.2 dl/g.

The average molecular weight for a sample of an intrinsic viscosity of 11.3 dl/g was calculated to be 18,000.

What is claimed is:

1. Poly{[benzo(1,2-d:4,5-d')bisthiazole-2,6-diyl]1,4-phenylene} having the structure

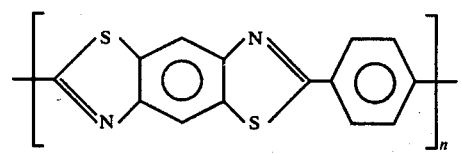

wherein n has a value of from about 50 to 100.

2. The polymer of claim 1 prepared by the reaction of 2,5-diamino-1,4-benzenedithiol dihydrochloride with terephthalic acid.

* * * * *

UNITED STATES PATENT AND TRADEMARK OFFICE
CERTIFICATE OF CORRECTION

PATENT NO. : 4,225,700
DATED : September 30, 1980
INVENTOR(S) : James Frederick Wolfe and Bock Hoy Loo It is certified that error appears in the above-identified patent and that said Letters Patent are hereby corrected as shown below:

In the specification:

Column 1, lines 38 to 46, the formula should appear as follows:

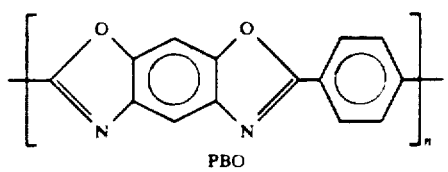

Column 2, lines 1 to 7, the formula should appear as follows:

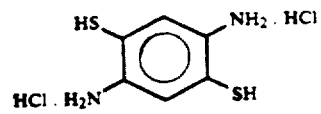

UNITED STATES PATENT AND TRADEMARK OFFICE
CERTIFICATE OF CORRECTION

PATENT NO. : 4,225,700

DATED : September 30, 1980

INVENTOR(S) : James Frederick Wolfe and Bock Hoy Loo

It is certified that error appears in the above-identified patent and that said Letters Patent are hereby corrected as shown below:

In the specification:

Column 2, lines 12 to 21, the formula should appear as follows:

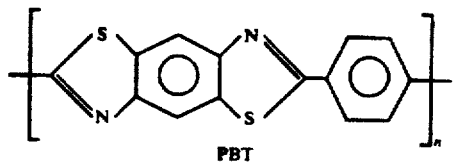

Signed and Sealed this

Twenty-fifth Day of August 1981

[SEAL]

Attest:

Attesting Officer

GERALD J. MOSSINGHOFF

Commissioner of Patents and Trademarks